Aug. 29, 1939.  R. M. WERNER  2,171,381
SIDE WALL CONSTRUCTION FOR VEHICLE BODIES
Filed Dec. 10, 1938  2 Sheets-Sheet 1
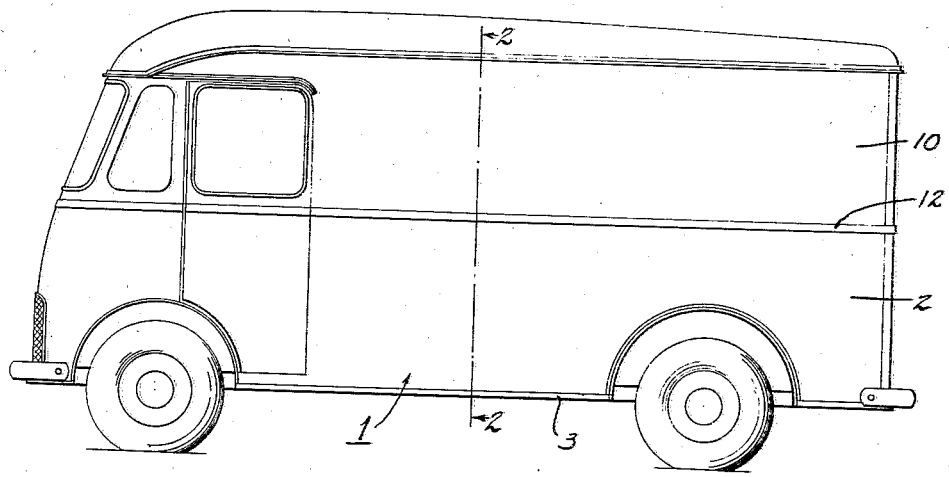
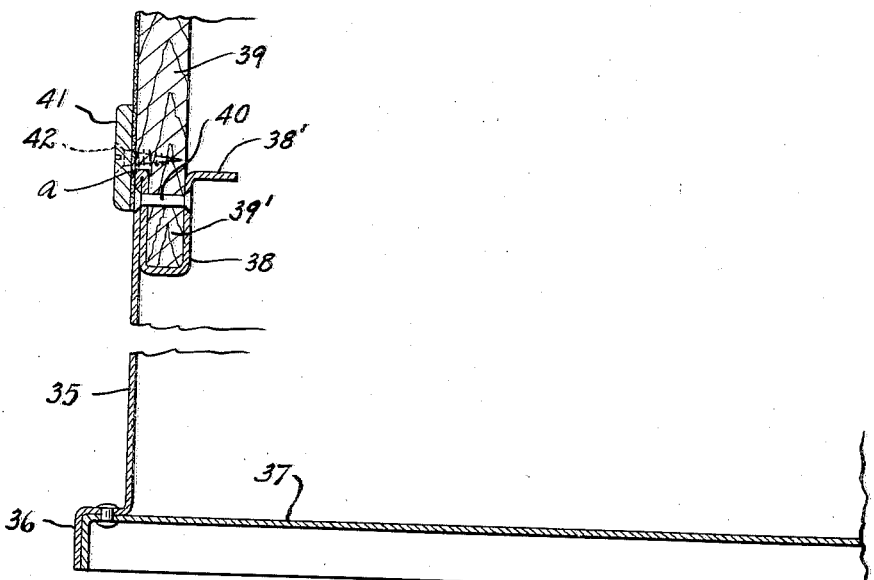
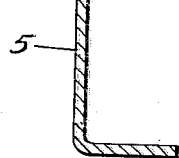
INVENTOR:
Ralph M Werner,
BY
*signature*
ATTORNEY.

Aug. 29, 1939.　　　　R. M. WERNER　　　　2,171,381
SIDE WALL CONSTRUCTION FOR VEHICLE BODIES
Filed Dec. 10, 1938　　2 Sheets-Sheet 2
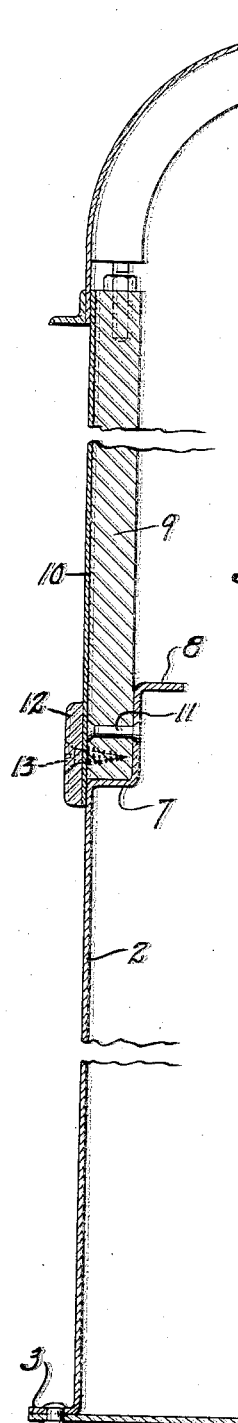
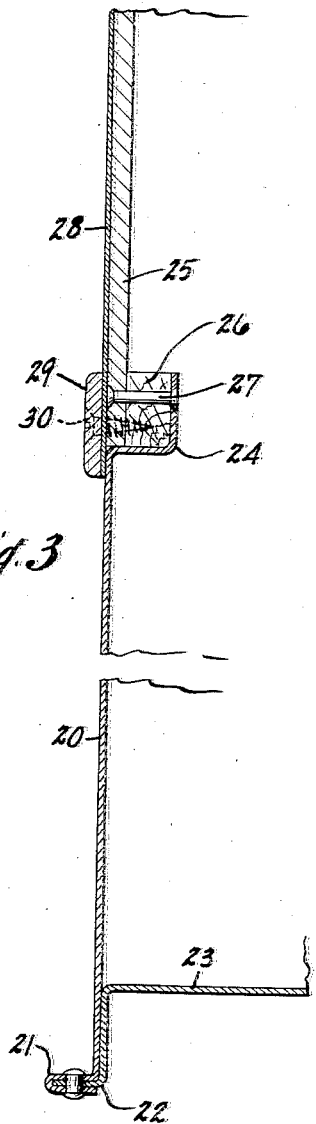
INVENTOR:
Ralph M. Werner,
BY
His ATTORNEY Patented Aug. 29, 1939

2,171,381

UNITED STATES PATENT OFFICE 2,171,381

SIDE WALL CONSTRUCTION FOR VEHICLE BODIES

Ralph M. Werner, Brooklyn, N. Y.

Application December 10, 1938, Serial No. 244,939

13 Claims. (Cl. 296—30)

This invention relates to vehicle bodies having sectional side walls and has for its particular objects the provision of an economical and rigid sectional side wall which is relatively light and yet extremely strong and rigid for its weight, besides being simple and easy to assemble. Other advantages of the invention are hereinafter set forth.

In the accompanying drawings in which I have illustrated some preferred embodiments of my invention, Figure 1 is a side elevation of a vehicle wherein my improved sectional side wall construction is employed;

Fig. 2 is a fragmentary, vertical section taken on the line 2—2 of Fig. 1;

Fig. 3 is a fragmentary, vertical section of a modified form of wall structure; and Fig. 4 is a fragmentary, vertical section of a still further modification of the side wall construction.

Referring to the drawings and the construction shown therein, the reference numeral 1 designates a vehicle body of the delivery truck type, the side walls of which embody my invention, said side walls comprising a lower sheet metal panel or section 2 having a bottom flange 3. The floor of the vehicle 4 is supported on the longitudinal 5 of the chassis and has a drop flange 6 which is secured at its outer margin to said flange 3 by rivets or by welding or by any other suitable manner. The said section 2 is offset along its upper margin to form a step or shoulder 7 and an inwardly projecting longitudinally extending flange 8, which latter serves as additional stiffening means for said section.

An upper section or panel 9, preferably of ply wood, rests within the offset Z-shaped step formed on the top of the sheet metal section 2, the same being provided with a covering 10 of canvas, of sheet metal, fabric or the like and said panel 9 is riveted to the vertical wall of said Z-shaped offset or shoulder by a rivet 11. A molding strip 12 extends along the entire side of the vehicle and serves to cover the joint between the panels 2 and 9, the same being preferably secured in position by means of wood screws 13.

In the modification illustrated in Fig. 3, a sheet metal lower panel 20 has a U-shaped bottom longitudinal flange which receives a drop flange 22, to which it is riveted or otherwise secured, of a sheet metal bottom 23 of the vehicle body. At its upper end said panel is offset to form an angle iron shoulder 24 which serves as a support for a relatively thin upper section or panel 25, formed of ply wood, laminated wood or the like and which is held in position on said shoulder so as to prevent its lateral shifting therealong by means of a filler-strip 26 inserted between the inner face of said panel 25 and the inner vertical face of said shoulder. A rivet 27 serves to secure said panel, said filler-strip and said shoulder together. The covering 28, similar to the aforesaid covering 10, is secured to the outer face of the panel 25 and a molding strip 29 which is secured by a wood screw 30 to said panel 25 and said filler 26, serve to conceal the longitudinal joint between the bottom of the panel 25 and its covering and the adjacent upper edge of the sheet metal panel 29.

In Fig. 4 the reference numeral 35 designates the bottom sheet metal panel, the same having an integral angle-iron, longitudinal flange formed along the bottom thereof as designated by the numeral 36, and the flanged outer end of the body floor 35 is riveted or otherwise secured to said flange 36. The upper edge of the sheet metal panel 35 is folded on itself at $a$ to form a channel 38 which has an offset lip along its inner upper margin as designated by the reference numeral 38'. An upper panel or section 39 of ply wood or laminated wood having a reduced lower end 39', which fits into said channel, is secured in position therein by a rivet 40. A molding strip 41 conceals the joint between the upper end of the panel 35 and the lower edge of the panel 39 and its covering, the same being secured in position by means of wood screws 42.

The aforesaid side wall construction, especially in those cases where the lower panel is formed of thin sheet metal and the top panel of laminated wood or pressed composition board and the latter panel is covered with a finishing or protecting layer of light gauge sheet metal or fabric, is of considerable less weight due to the thinner wall and the character of the materials employed in its construction than that obtainable by the usual method employed or constructing side walls of vehicles and particularly of so-called commercial delivery trucks. At the same time, notwithstanding the aforesaid thinness of the wall, the same is unusually strong and is longitudinally stiffened by the integral stiffening members formed on the lower panel, so that such side walls are in every way as satisfactory as those wherein such elements are employed in order to obtain the requisite strength and stiffness.

Of course it is understood that if desired the floor of the vehicle body may be composed of wood, but preferably the same is formed of heavy gauge steel which is ideally adapted for use in this construction since it lends itself to the production, in association with the lower side panel, of flanges which, when united together by rivets or by welding, not only form water-tight joints but as additional longitudinal strengthening elements for the vehicle body.

Various modifications and changes from the construction herein described may be made without departing from the spirit of my invention as embraced within the scope of the appended claims.

Having thus described my invention, what I claim and desire to obtain by United States Letters Patent is:

1. A side wall construction for vehicle bodies, comprising a thin longitudinally extending lower sheet metal side panel having an integral inner stiffening channel member extending along its upper margin, a relatively thick light weight upper laminated panel mounted in said channel and means adjacent said channel member for securing said panels together.

2. A vehicle body having a lower thin sheet metal panel extending longitudinally along the side of the body, said panel having an integral stiffening channel member offset from its inner side at its upper margin, an inwardly projecting inner flange on said channel member, a relatively thick, light weight upper panel mounted in said channel member and means adjacent said channel member for securing said panels together.

3. A vehicle body having a longitudinally extending, relatively thin, sheet metal, lower side panel having an integral stiffening channel member extending along its upper inner margin, a relatively thick, light weight upper side panel mounted in said channel member and means extending through the upper panel and securing the same to said channel member.

4. A vehicle body as claimed in claim 3, wherein the upper panel is composed of ply wood.

5. A vehicle body as claimed in claim 3, wherein the upper panel is composed of composition board.

6. A vehicle body as claimed in claim 3, wherein the upper panel is thicker than the lower panel but thinner than the width of said channel and a filler strip is positioned in the said channel adjacent the portion of the upper panel which projects into said channel and wherein the fastening means also secures said filler strip in position.

7. A vehicle body as claimed in claim 3, wherein the channel member is integral with the lower side panel and has an inwardly projecting integral stiffening flange.

8. A vehicle body as claimed in claim 3, wherein the upper margin of the lower panel is folded on itself to form the outer wall of the channel member.

9. A vehicle body as claimed in claim 3, wherein the upper margin of the lower panel is folded on itself to form the outer wall of said channel member and an integral flange extending inwardly from the upper edge of the inner wall of said channel member.

10. A vehicle body having a longitudinally extending lower sheet metal relatively thin side panel, said panel being inwardly offset along the top portion thereof to form an angular supporting shoulder, said shoulder having an integral stiffening top flange projecting inwardly therefrom, an upper panel mounted on said shoulder and means adjacent said shoulder for fastening said panels together.

11. A vehicle body having a sheet metal longitudinally extending relatively thin lower side panel, an integral offset stiffening shoulder having portions thereof extending in three different planes, a light weight relatively thick laminated wooden panel supported on said shoulder and fastening means adjacent said shoulder for securing said panels together.

12. A side wall construction for vehicle bodies, comprising a lower section of sheet metal having an integral, longitudinally extending offset shoulder adjacent the top thereof and which shoulder has an integral upwardly extending flange at the inner margin thereof and distant from said panel, an upper panel composed of a member of a group of materials, consisting of laminated wood and composition board, mounted on said shoulder and means for securing said upper panel and said lower panel together.

13. A side wall construction for automobile delivery trucks, comprising a lower longitudinally extending panel of sheet metal having its top edge folded on itself to form a longitudinal channel with an inwardly projecting integral flange formed at the top of the inner wall of said channel which is distant from said folded portion, an upper relatively thick panel having a reduced portion adjacent its lower end and which reduced portion is fitted into said channel and supported thereby, fastening means for securing said top panel to said channel, a covering composed of a group of materials consisting of thin gauge metal, fabric leather and artificial leather secured to the outer surface of said upper panel and a longitudinal molding strip which is secured to said upper panel and extends downwardly across the upper end of said lower panel to conceal the joint therebetween.

RALPH M. WERNER.